(12) United States Patent
Kunifuda

(10) Patent No.: US 7,541,752 B2
(45) Date of Patent: Jun. 2, 2009

(54) ILLUMINATING DEVICE AND LIQUID CRYSTAL DISPLAY

(75) Inventor: Shuichi Kunifuda, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 61 days.

(21) Appl. No.: 11/423,802

(22) Filed: Jun. 13, 2006

(65) Prior Publication Data

US 2006/0285031 A1    Dec. 21, 2006

(30) Foreign Application Priority Data

Jun. 21, 2005    (JP) .............................. 2005-180774

(51) Int. Cl.
*H05B 37/00* (2006.01)
*G05F 1/00* (2006.01)
*G09G 3/10* (2006.01)
*G09G 3/30* (2006.01)

(52) U.S. Cl. ...................... 315/312; 315/318; 315/291; 345/80; 345/77

(58) Field of Classification Search ................ 315/189, 315/185 R, 186–187, 192, 193, 224, 312, 315/485 R; 345/204–206, 214, 36, 39, 45, 345/50, 76, 84; 362/800
See application file for complete search history.

(56) References Cited

U.S. PATENT DOCUMENTS 6,864,867 B2 * 3/2005 Biebl ........................... 345/82
7,061,572 B2 * 6/2006 Yamakita ..................... 349/191
7,148,632 B2 * 12/2006 Berman et al. .............. 315/189
2005/0077838 A1 * 4/2005 Blumel ........................ 315/289
2005/0259439 A1 * 11/2005 Cull et al. ..................... 362/612
2007/0097293 A1 * 5/2007 Nakanishi et al. ............. 349/95

FOREIGN PATENT DOCUMENTS

| CN | 1863423 A | 11/2006 |
| JP | 11-305198 | 11/1999 |
| JP | 2002-231471 | 8/2002 |
| JP | 2003-332624 | 11/2003 |

* cited by examiner

*Primary Examiner*—Douglas W. Owens
*Assistant Examiner*—Minh Dieu A
(74) *Attorney, Agent, or Firm*—Oblon, Spivak, McClelland, Maier & Neustadt, P.C.

(57) ABSTRACT

An illuminating device comprises a plurality of light-emitting element groups each including a plurality of series-connected light-emitting elements, a load which is connected in series with one of the light-emitting element groups, and forms a reference element group together with the one light-emitting element group, and a driving circuit which includes a monitor unit which monitors an electrical characteristic value of the reference element group, and supplies an electric current set on the basis of the electrical characteristic value obtained by the monitor unit to the reference element group and the other light-emitting element groups.

3 Claims, 2 Drawing Sheets

ILLUMINATING DEVICE AND LIQUID CRYSTAL DISPLAY

CROSS-REFERENCE TO RELATED APPLICATIONS

This application is based upon and claims the benefit of priority from prior Japanese Patent Application No. 2005-180774, filed Jun. 21, 2005, the entire contents of which are incorporated herein by reference.

BACKGROUND OF THE INVENTION

1. Field of the Invention

The present invention relates to an illuminating device including a plurality of light-emitting elements, and a liquid crystal display including the illuminating device.

2. Description of the Related Art

Recently, liquid crystal displays are required to have high-brightness output characteristics. A liquid crystal display includes a liquid crystal display panel and illuminating device. The liquid crystal display panel has an array substrate, a counter-substrate which is arranged opposite to the array substrate with a gap therebetween, and a liquid crystal layer held therebetween. The array substrate and counter-substrate are adhered to each other by a sealing member provided on the edge portions of the substrates.

The illuminating device has a light guiding plate formed on a back side of a display surface of the liquid crystal display panel, i.e., on an external side of the array substrate, a light source formed on a side edge of the light guiding plate, and a driving circuit which drives the light source. A cold-cathode tube is used as the light source. Recently, however, an illuminating device using a plurality of light-emitting diodes (LEDs) as light sources has been developed as disclosed in, e.g., Jpn. Pat. Appln. KOKAI Publication No. 11-305198.

When a liquid crystal display is required to have high-brightness output characteristics, the brightness output of the display screen must be held at a predetermined level or greater. For this purpose, an illuminating device capable of holding the brightness output of an LED at a predetermined level or greater is required. It is also required to downsize peripheral devices of LEDs forming the illuminating device so as not to spoil the characteristics such as a lightness and slimness of the whole liquid crystal display even when the illuminating device is formed.

The present invention has been made in consideration of the above situation, and has as its object to provide an illuminating device capable of suppressing an increase in product size and obtaining a predetermined brightness level or greater, and a liquid crystal display including the illuminating device.

BRIEF SUMMARY OF THE INVENTION

In order to attain the above object, according to an aspect of the present invention, there is provided an illuminating device comprising:

a plurality of light-emitting element groups each including a plurality of series-connected light-emitting elements;

a load which is connected in series with one of the light-emitting element groups, and forms a reference element group together with the one light-emitting element group; and a driving circuit which includes a monitor unit which monitors an electrical characteristic value of the reference element group, and supplies an electric current set on the basis of the electrical characteristic value obtained by the monitor unit to the reference element group and the other light-emitting element groups.

According to another aspect of the present invention, there is provided a liquid crystal display comprising:

a liquid crystal display panel including an array substrate, a counter substrate which is arranged opposite to the array substrate with a gap therebetween, and a liquid crystal layer held between the array substrate and the counter-substrate; and an illuminating device which illuminate the liquid crystal display panel, the illuminating device including a plurality of light-emitting element groups each including a plurality of series-connected light-emitting elements, a load which is connected in series with one of the light-emitting element groups, and forms a reference element group together with the one light-emitting element group, and a driving circuit which includes a monitor unit which monitors an electrical characteristic value of the reference element group, and supplies an electric current set on the basis of the electrical characteristic value obtained by the monitor unit to the reference element group and the other light-emitting element groups.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A liquid crystal display according to an embodiment of the present invention will be described below with reference to the accompanying drawing.

Figure 1:
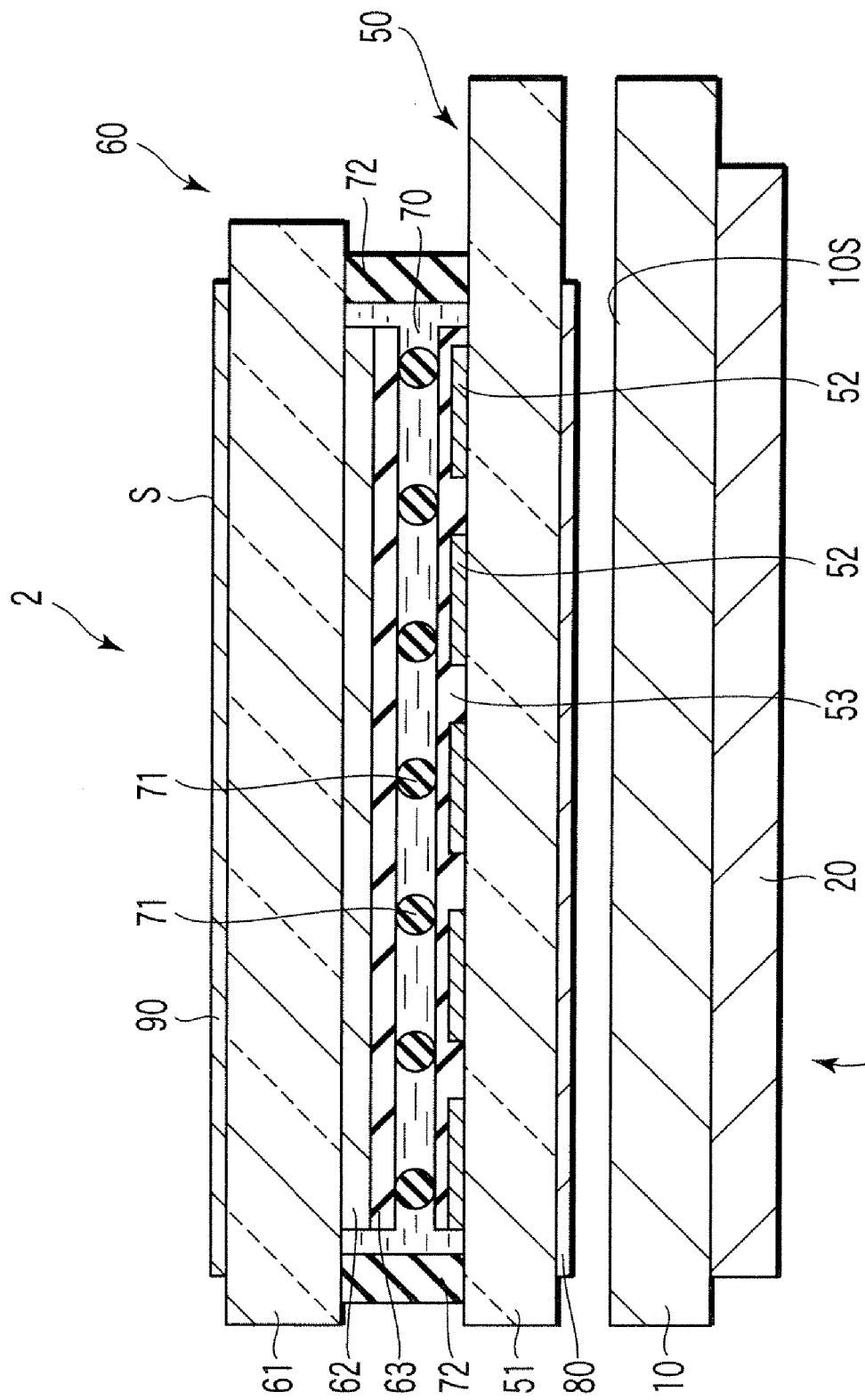
FIG. 1 is a sectional view showing a liquid crystal display according to an embodiment of the present invention.

As shown in FIG. 1, the liquid crystal display comprises a backlight unit 1 as an illuminating device, and a liquid crystal display panel 2.

Figure 2:
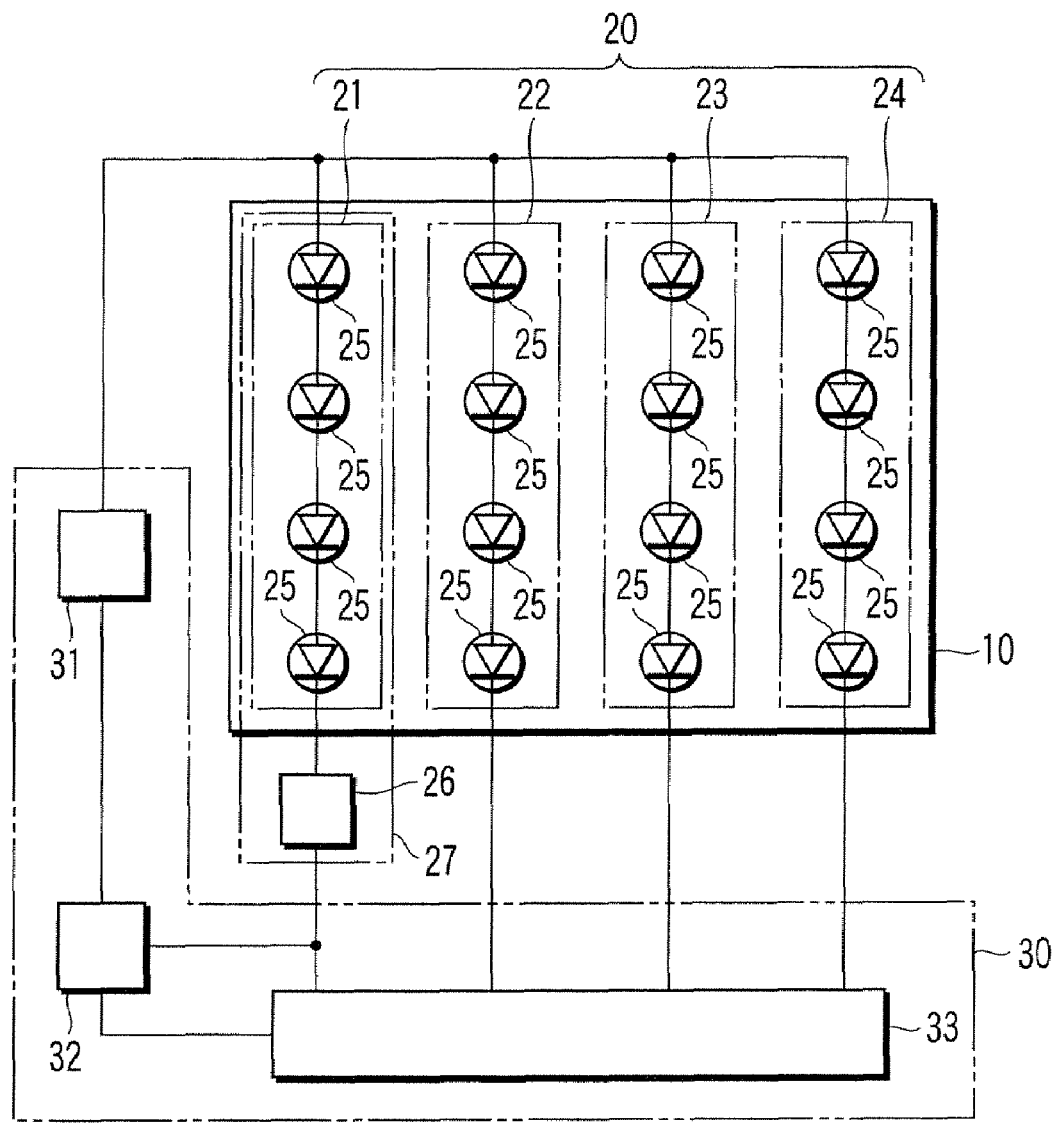
FIG. 2 is a schematic plan view showing a backlight unit shown in FIG. 1.

As shown in FIGS. 1 and 2, the backlight unit 1 includes a light guiding plate 10 as a transparent member having a light-emitting surface 10S, a light source 20 and a driving circuit 30. The backlight unit 1 may be formed by forming an optical system such as a prism sheet and diffusion film (neither is shown) on the light guiding plate 10.

The light source 20 which illuminates the liquid crystal display panel 2 has first, second, third and fourth light-emitting element groups 21, 22, 23 and 24 as a plurality of light-emitting element groups, and an LED 26 as a load. Each of the first to fourth light-emitting element groups 21 to 24 has a plurality of LEDs 25 as a plurality of series-connected light-emitting elements. The LED 26 is connected in series with the first light-emitting element group 21, and forms a reference element group 27 together with the first light-emitting element group 21. In this embodiment, each of the first to fourth light-emitting element groups 21 to 24 has four LEDs 25. The plurality of LEDs 25 of the light source 20 arranged opposite to an outer surface on the side away from the light-emitting surface 10S of the light guiding plate 10, and function as a surface light source. In this arrangement, the LED 26 is placed in a portion where it has no influence on the light-emitting surface 10S of the light guiding plate 10, and has no function of directly illuminating the liquid crystal display panel 2.

Since the reference element group 27 has the LED 26, the power consumption of the reference element group 27 is larger than that of each of the second, third and fourth light-emitting element groups 22, 23, and 24. More specifically, letting Vf be the forward voltage of the LED 26, the power consumption when four LEDs 25 are connected in series is so set as to be Vf×5 which is the power consumption of the first light-emitting element group 21 having a voltage of Vf×4 plus the forward voltage Vf of the LED 26.

The driving circuit 30 has a power supply unit 31 which supplies power, a monitor unit 32 and a constant-current controller 33 which controls an electric current flowing through the LED 25 so that it remains constant. The monitor unit 32 monitors the electrical characteristic value, e.g., the current value of the reference element group 27. The constant-current controller 33 supplies a constant electric current set on the basis of the current value obtained by the monitor unit 32 to the reference element group 27 and the second, third and fourth light-emitting element groups 22, 23 and 24.

As shown in FIG. 1, the liquid crystal display panel 2 has an array substrate 50 provided opposite to the light-emitting surface 10S, a counter-substrate 60, a liquid crystal layer 70, a first polarizer 80 and a second polarizer 90.

The array substrate 50 has a glass substrate 51, a plurality of pixel electrodes 52 formed on the glass substrate 51, and an alignment film 53 formed on the glass substrate 51 and the pixel electrodes 52. Each pixel electrode 52 forms a pixel. The array substrate 50 also has various wiring, thin-film transistors (TFTs) as switching elements, and the like (none of them is shown) formed on the glass substrate 51.

The counter substrate 60 has a glass substrate 61, a common electrode 62 formed on the glass substrate 61 and an alignment film 63 formed on the common electrode 62. The pixel electrodes 52 and common electrode 62 are made of a transparent conductive material such as indium tin oxide (ITO). An aligning process (rubbing) is performed on the alignment films 53 and 63.

The array substrate 50 and counter substrate 60 are arranged opposite to each other with a predetermined gap by a plurality of spacers 71. The array substrate 50 and counter-substrate 60 are adhered to each other by a sealing member 72 formed on edge portions of these two substrates. The liquid crystal layer 70 is held between the array substrate 50, counter-substrate 60 and sealing member 72. The first polarizer 80 is placed on that outer surface of the array substrate 50, which faces the light guiding plate 10. The second polarizer 90 is placed on the outer surface of the counter-substrate 60. The outer surface of the second polarizer 90 functions as a display surface S.

A method of driving the backlight unit 1 will be described in detail below.

When the backlight unit 1 requires illumination having a brightness of 200 cd, for example, each of the first to fourth light-emitting element groups 21 to 24 need only have a brightness of 50 cd. To drive the backlight unit 1 to illuminate the display, therefore, the monitor unit 32 monitors the reference element group 27. The constant-current controller 33 supplies a constant electric current set on the basis of the current value obtained by the monitor unit 32 to the reference element group 27 and the second, third and fourth light-emitting element groups 22, 23 and 24, so that a brightness of 50 cd is obtained by the first light-emitting element group 21.

Accordingly, a brightness of 50 cd or more is obtained by each of the second to fourth light-emitting element groups 22 to 24 having the power consumption smaller than that of the reference element group 27. As a consequence, the backlight unit 1 can illuminate the display with a brightness of 200 cd.

In the backlight unit 1 and liquid crystal display configured as described above, the reference element group 27 has the LED 26 in addition to the plurality of LEDs 25. Therefore, the power consumption of the reference element group 27 is larger than that of each of the second, third and fourth light-emitting element groups 22, 23 and 24. The driving circuit 30 supplies a constant electric current set on the basis of the current value obtained by the monitor unit 32 to the reference element group 27, and the second, third and fourth light-emitting element groups 22, 23 and 24.

Accordingly, a predetermined necessary brightness level or more can be stably obtained even if power consumption variations of the LEDs 25 cause power consumption variations between the first, second, third, and fourth light-emitting elements 21, 22, 23 and 24.

Also, since the second to fourth light-emitting element groups 22 to 24 need not be monitored, no monitor units corresponding to the second to fourth light-emitting element groups 22 to 24 need be formed in the backlight unit 1. This suppresses an increase in product size of the backlight unit 1.

Note that the present invention is not limited to the above embodiment, and can be variously modified within the spirit and scope of the invention. For example, when each of the first to fourth light-emitting element groups 21 to 24 has $\underline{n}$ LEDs 25, the power consumption of the reference element group 27 can be a voltage of Vf×n of the first light-emitting element group 21 plus the forward voltage Vf of the LED 26.

The monitor unit 32 may also monitor the voltage as the electrical characteristic value of the reference element group 27. In this case, the constant-current controller 33 need only supply a constant electric current set on the basis of the voltage to the reference element group 27 and the second, third and fourth light-emitting element groups 22, 23 and 24.

The first to fourth light-emitting element groups 21 to 24 need only have the same number of series-connected LEDs 25. The LED 26 need only be connected in series with one of the plurality of light-emitting element groups each having the plurality of series-connected LEDs 25, and form the reference element group 27 together with this light-emitting element group. The LED 26 need only be a load which increases the power consumption of the reference element group 27, and may also be, e.g., a diode or resistor, instead of an LED. The light source 20 may also be formed to face each other along the side edges of the light guiding plate 10.

What is claimed is:

1. An illuminating device comprising:
   a plurality of light-emitting element groups each including a plurality of series-connected light-emitting elements, the plurality of light-emitting element groups connected in parallel to each other;
   a load which is connected in series with only one of the light-emitting element groups, and forms a reference element group together with the one light-emitting element group; and
   a driving circuit which includes a monitor unit which monitors an electrical characteristic value of the reference element group, and supplies an electric current set on the basis of the electrical characteristic value obtained by the monitor unit to the reference element group and the other light-emitting element groups, wherein power consumption of the reference element group is larger than power consumption of each of the other light-emitting element groups, and wherein the driving circuit comprises a constant-current controller which supplies a constant electric current set on the basis of the electrical characteristic value to the reference element group and the other light-emitting element groups.

2. The device according to claim 1, wherein the electrical characteristic value is one of a current value and a voltage value.

3. A liquid crystal display comprising:

a liquid crystal display panel including an array substrate, a counter substrate which is arranged opposite to the array substrate with a gap therebetween, and a liquid crystal layer held between the array substrate and the counter-substrate; and an illuminating device which illuminate the liquid crystal display panel, the illuminating device including a plurality of light-emitting element groups each including a plurality of series-connected light-emitting elements, the plurality of light-emitting element groups connected in parallel to each other, a load which is connected in series with only one of the light-emitting element groups, and forms a reference element group together with the one light-emitting element group, and a driving circuit which includes a monitor unit which monitors an electrical characteristic value of the reference element group, and supplies an electric current set on the basis of the electrical characteristic value obtained by the monitor unit to the reference element group and the other light-emitting element groups.

* * * * *